Nov. 4, 1924. 1,514,234

F. W. SEVERIN

ENGINE

Filed July 13, 1921

Witness:
John Enders

Inventor:
Frank W. Severin
by Fred Gerlach
his Atty.

Patented Nov. 4, 1924.

1,514,234

UNITED STATES PATENT OFFICE.

FRANK W. SEVERIN, OF CHICAGO, ILLINOIS, ASSIGNOR TO VENN-SEVERIN MACHINE CO., OF CHICAGO, ILLINOIS, A CORPORATION OF ILLINOIS.

ENGINE.

Application filed July 13, 1921. Serial No. 484,307.

*To all whom it may concern:*

Be it known that I, FRANK W. SEVERIN, a citizen of the United States, and a resident of Chicago, in the county of Cook and State of Illinois, have invented certain new and useful Improvements in Engines, of which the following is a full, clear, and exact description.

The invention relates to engines and its object is to provide improved means for preventing leakage of air, gases or fluids through the bearings particularly between the crank-shaft and the crank-case.

The invention consists in the several novel features hereinafter set forth and more particularly defined by claim at the conclusion hereof.

Figure 1:
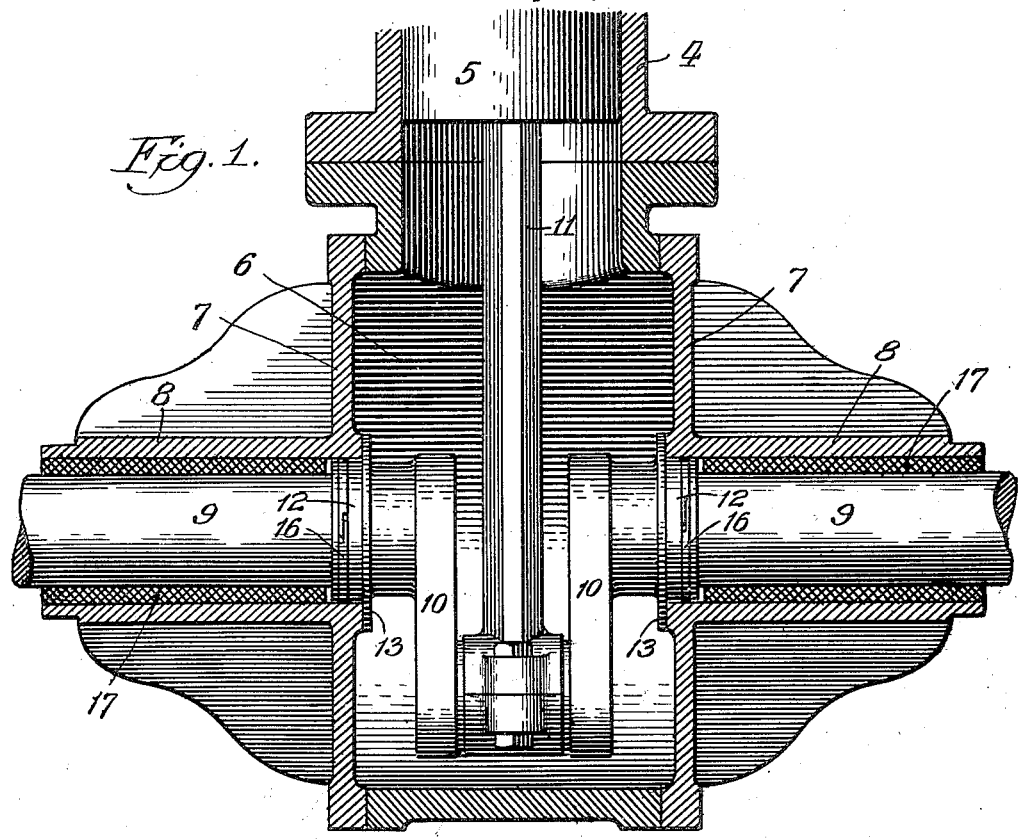
Figure 2:
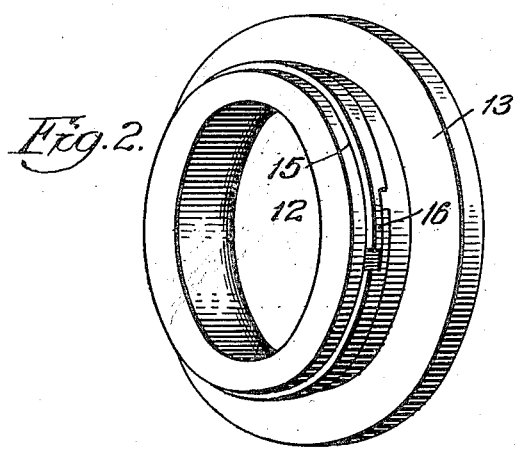
Figure 3:
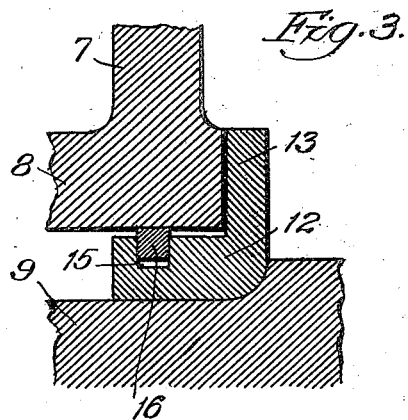

In the drawings: Fig. 1 is a vertical axial section of a portion of an engine embodying the invention. Fig. 2 is a perspective of one of the spring-ring containers. Fig. 3 is a section through the retainer and ring upon an enlarged scale.

The invention is exemplified in an engine casing comprising a cylinder 4, a crank-case 6 secured to the cylinder, heads 7 bolted to the sides of the crank-case and provided with bearings 8 for the shaft 9 which is provided with a crank 10 which is connected by the usual pitman 11 to the piston 5 which works in the cylinder.

In the operation of two cycle engines, it is important to prevent the escape of air or fluid from the crank-case, and for this purpose, collars 12 are disposed on the shaft 9 adjacent the inner sides of the heads respectively. These collars are preferably formed of brass and so they will be tight around the shaft and are driven thereon so as to form a fluid-tight fit. Each of these collars is provided with an outwardly extending flange 13 which laps the inner end of one of the bearings 8 on one of the crank-case heads 7 so that the shaft will be held thereby against endwise movement relatively to the bearings. Each collar 12 extends outwardly into one of the bearings 8 and is provided with a peripheral groove 15 in which is fitted a split resilient or spring-ring 16 which expands outwardly in the groove 15 and bears against the inner periphery of the bearing 8 with sufficient pressure so it will remain stationary while the shaft is revolving.

These rings effectively prevent leakage of any fluid under compression or oil in the crank-case between the shaft and the bearings and avoid wear which results in leakage. The latter is usually provided with a babbitt bushing 17, as well understood in the art.

The invention is not to be understood as restricted to the details set forth since these may be modified within the scope of the appended claim, without departing from the spirit and scope of the invention.

Having thus described the invention, what I claim as new and desire to secure by Letters Patent, is:

An oil seal for an engine comprising a collar around and adapted to be secured on the crank-shaft of said engine, extending longitudinally of said shaft, having a peripheral groove therein and an outwardly extending integral flange to lap the inner end of the bearing on said crank-shaft, and a spring-ring in said groove adapted to engage said bearing.

FRANK W. SEVERIN.